US011350360B2

(12) United States Patent
Khanna

(10) Patent No.: US 11,350,360 B2
(45) Date of Patent: May 31, 2022

(54) GENERATING ADAPTIVE MODELS FOR IOT NETWORKS

(71) Applicant: Amazon Technologies, Inc., Seattle, WA (US)

(72) Inventor: Aran Khanna, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 15/635,148

(22) Filed: Jun. 27, 2017

(65) Prior Publication Data

US 2018/0376416 A1 Dec. 27, 2018

(51) Int. Cl.
| | |
|---|---|
| *H04W 52/02* | (2009.01) |
| *H04W 24/08* | (2009.01) |
| *H04W 84/18* | (2009.01) |
| *H04W 92/10* | (2009.01) |
| *H04W 4/70* | (2018.01) |

(52) U.S. Cl.
CPC ....... *H04W 52/0212* (2013.01); *H04W 24/08* (2013.01); *H04W 84/18* (2013.01); *H04W 4/70* (2018.02); *H04W 92/10* (2013.01)

(58) Field of Classification Search
None
See application file for complete search history.

(56) References Cited

U.S. PATENT DOCUMENTS

| | | | | |
|---|---|---|---|---|
| 7,035,240 | B1* | 4/2006 | Balakrishnan | H04W 84/18 |
| | | | | 370/338 |
| 8,769,691 | B1 | 7/2014 | Hsueh et al. | |
| 9,258,765 | B1* | 2/2016 | daCosta | H04W 84/18 |
| 2005/0078672 | A1* | 4/2005 | Caliskan | H04L 45/42 |
| | | | | 370/389 |
| 2009/0044263 | A1 | 2/2009 | Lingafelt et al. | |

(Continued)

FOREIGN PATENT DOCUMENTS

| | | |
|---|---|---|
| CN | 103002050 A | 3/2013 |
| CN | 103377252 A | 10/2013 |

(Continued)

OTHER PUBLICATIONS

U.S. Appl. No. 15/635,144, filed Jun. 27, 2017, Aran Khanna.

(Continued)

*Primary Examiner* — Alex Skripnikov
(74) *Attorney, Agent, or Firm* — Robert C. Kowert; Kowert, Hood, Munyon, Rankin & Goetzel, P.C.

(57) ABSTRACT

A hub device of a network receives topology data for the network that indicates changes in a topology or performance of the network. The hub device determines modifications to processing functions for edge devices of the network based on the topology data. The hub device deploys the modifications to respective edge devices of the network. An edge device may collect data and use a processing function to perform operations on the data, generate processed data, and send the processed data to the hub device for further processing. In some cases, a remote provider network receives topology data for the network and generates modifications to processing functions for edge devices of the network based on the topology data. The remote provider network then transmits the modifications to the network.

20 Claims, 14 Drawing Sheets

(56) References Cited

U.S. PATENT DOCUMENTS

| | | | |
|---|---|---|---|
| 2013/0182615 A1* | 7/2013 | Sun | H04W 52/0219 370/255 |
| 2014/0032495 A1 | 1/2014 | Erofeev | |
| 2014/0115166 A1 | 4/2014 | Kucharczyk et al. | |
| 2014/0258513 A1 | 9/2014 | Letca et al. | |
| 2014/0355481 A1* | 12/2014 | On | H04W 24/02 370/254 |
| 2015/0052247 A1 | 2/2015 | Threefoot et al. | |
| 2015/0242760 A1 | 8/2015 | Miao et al. | |
| 2015/0281253 A1 | 10/2015 | Lords et al. | |
| 2015/0350018 A1 | 12/2015 | Hui et al. | |
| 2016/0012640 A1 | 1/2016 | Abraham | |
| 2016/0014008 A1 | 1/2016 | Metts et al. | |
| 2016/0034253 A1 | 2/2016 | Bang et al. | |
| 2016/0067864 A1 | 3/2016 | Metts et al. | |
| 2016/0248809 A1 | 8/2016 | Smith et al. | |
| 2016/0380892 A1* | 12/2016 | Mahadevan | H04L 45/02 370/389 |
| 2017/0034700 A1 | 2/2017 | Cohen et al. | |
| 2017/0078875 A1 | 3/2017 | Muhanna et al. | |
| 2017/0099309 A1 | 4/2017 | Di Pietro et al. | |
| 2017/0099353 A1* | 4/2017 | Arora | H04L 67/12 |
| 2018/0218085 A1 | 8/2018 | Price et al. | |
| 2018/0309831 A1 | 10/2018 | Sherman et al. | |
| 2020/0050918 A1 | 2/2020 | Chen et al. | |
| 2020/0128077 A1 | 4/2020 | Yu et al. | |

FOREIGN PATENT DOCUMENTS

| | | |
|---|---|---|
| CN | 104506352 A | 4/2015 |
| CN | 105338046 A | 2/2016 |
| CN | 106454704 A | 2/2017 |
| CN | 106790491 A | 5/2017 |
| WO | 2015126858 A1 | 8/2015 |

OTHER PUBLICATIONS

U.S. Appl. No. 15/635,147, filed Jun. 27, 2017, Aran Khanna.

U.S. Appl. No. 15/666,491, filed Aug. 1, 2017, Adolfo Bravo Ferreira.

Perera, Charith, et al., "Dynamic configuration of sensors using mobile sensor hub in internet of things paradigm", In 2013 IEEE Eighth International Conference on Intelligent Sensors, Sensor Networks and Information Processing, Apr. 2013, pp. 473-478, IEEE.

"Research on key technology of intelligent community management system based on Internet of things", Information Technology Series, China Excellent Master Degree Paper Full Text Database, Dec. 15, 2013, pp. 1-57.

Office Action dated May 5, 2021 in Chinese Patent Application No. 201880043273.0, Amazon Technologies, Inc., pp. 1-11.

Abidoye et al., "Models for integrating wireless sensor networks into the Internet of Things", The Institution of Engineering and Technology, IET Journals IET Wireless Sensory Systems, Feb. 2017, pp. 65-72.

* cited by examiner

GENERATING ADAPTIVE MODELS FOR IOT NETWORKS

BACKGROUND

The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, etc.

In some cases, IoT devices make use of a connection with a hub device to become a part of a local network of devices. The hub device typically is a more powerful device capable of performing more computations and at a faster rate than IoT devices. For example, a house may have a hub device that forms a wireless connection to multiple different sensor IoT devices, such as thermostats for measuring temperatures of different rooms or motion sensors in different rooms. The hub device may receive temperature values or motion data and transmit the temperature values or motion data to one nor more other endpoints. If the hub device is connected to the internet, then the values may be transmitted to a provider network or a user device, such as the user's smart phone.

Implementing a model to analyze data from many different IoT devices may require a large amount of network bandwidth. For example, a large volume of temperature data may be transmitted across a local network when many thermostat devices are collecting and sending data throughout a building. Moreover, various factors other than network traffic may cause performance of the network to become negatively impacted in different ways at different points in time. In some cases, the model implemented by the hub device may include valuable proprietary information, such as specialized classifiers that are used for analyzing image data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for configuring local networks of internet-connectable devices (e.g., IoT devices) to collect and process data while maintaining one or more objectives, such as efficient network performance. In embodiments, a remote provider network and/or a hub device connected to a network may be used to configure the network to process data collected by multiple IoT devices. For example, a provider network and/or a hub device may deploy data filters, portions of a data processing model, or other processing functions across multiple IoT devices in such a way as to increase network performance and/or decrease power consumption by edge devices.

In some embodiments, a provider network and/or a hub device may configure or change the functionality of a local network based on changes in network topology or changes in performance of the network. For example, a hub device may determine that performance of the network has fallen and in response, deploy modifications to various processing functions at edge devices. In embodiments, a proprietary portion of a data processing model remains secure on a hub device, while other portions of the same data processing model are deployed to edge devices.

Figure 1:
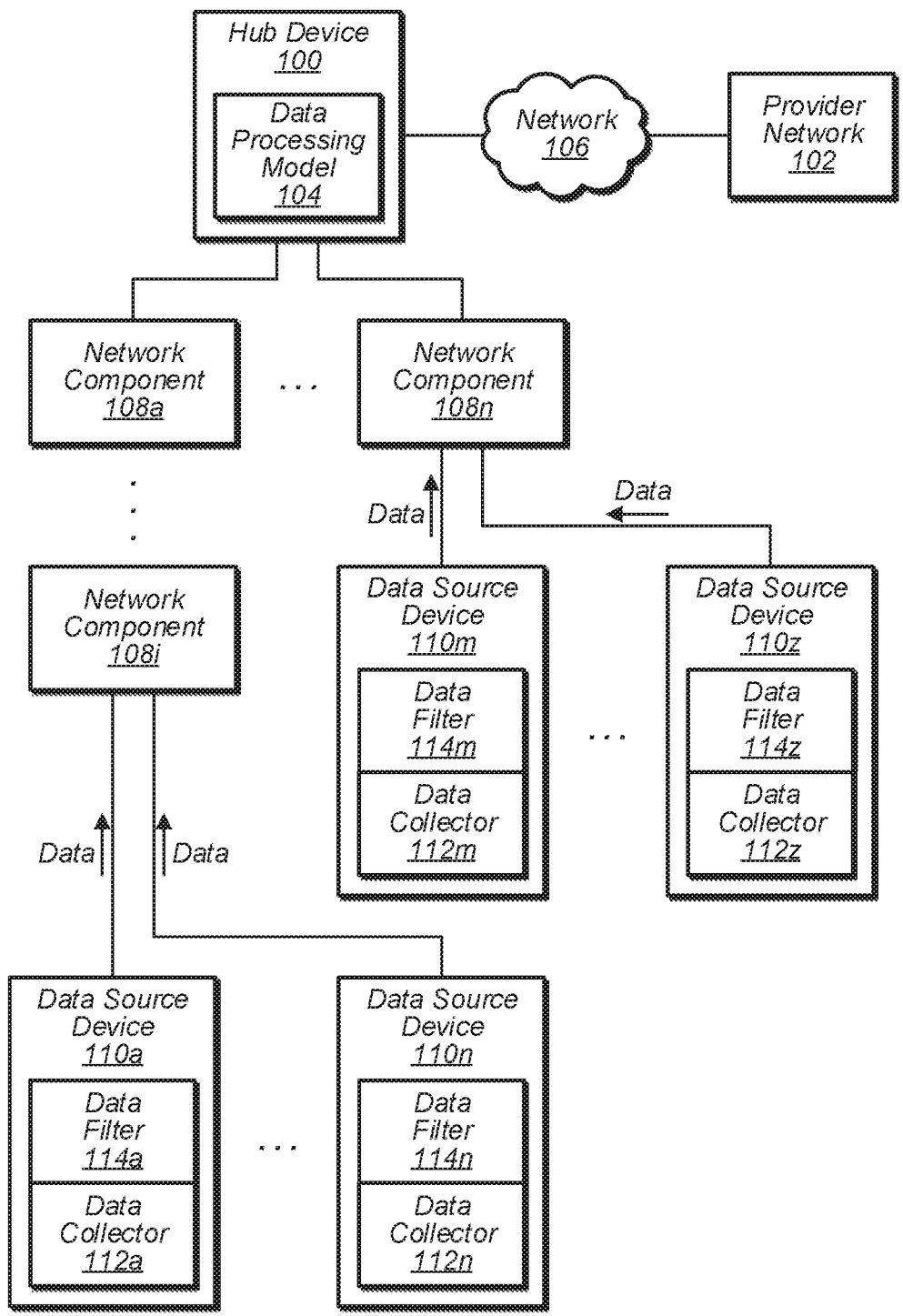
FIG. 1 illustrates a system for filtering data at data source devices and processing undiscarded data at a hub device, according to some embodiments.

FIG. 1 illustrates a system for filtering data at data source devices and processing undiscarded data at a hub device, according to some embodiments. A hub device 100, a provider network 102, edge devices, and any other components depicted in FIG. 1 may be the same as or include one or more of the same components as the hub device, the provider network, edge devices, and any other components depicted in any of FIGS. 2-16, in embodiments. Similarly, the provider network, hub device, edge devices, and other components depicted in any of FIGS. 2-16 may be the same as or include one or more same components as the hub device 100, the provider network 102, edge devices, and any other components depicted in FIG. 1.

Although FIGS. 1-16 may describe a single hub device of a local network, in various embodiments any number of hub devices may be used instead of a single hub device. For example, in some embodiments, multiple hub devices may be used as redundant hub devices to add fault-tolerance to the system. If one or more hub devices fail, a remaining one or more hub devices may continue to operate as described. Thus, in embodiments, a hub device may synchronize state with one or more other hub devices (e.g., at periodic intervals or upon detecting an event such as addition of a new hub device or failure of a hub device).

In some embodiments, two or more hub devices may collectively perform the various described operations instead of just one hub device. Thus, two or more hub devices may each perform a particular portion of the described operations (e.g., distributed processing). In other embodiments, a combination of redundant and distributed processing may be implemented via two or more hub devices.

In the depicted embodiment, the hub device 100 includes a data processing model 104 that may receive data from one or more sources and process the data. The data processing model 104 may include software and/or hardware that performs one or more operations on received data. In embodiments, the one or more operations may include analyzing the data, modifying the data based on the analyzing, and/or generating a response based on the analyzing (e.g., new data, one or more commands, or some other result).

In some embodiments, the hub device 100 and/or the data processing model 104 may transmit the response to one or more endpoints, such as the provider network 102 and/or other devices connected to the hub device 100. In embodiments, the data processing model 104 may be any combination of software and/or hardware that processes received data, regardless of complexity. In some cases, the data processing model 104 may simply forward some or all of the received data to one or more endpoints, without performing any other operations to the data or changes to the data.

In the depicted embodiment, the hub device 100 is connected to the provider network 102 via a wide-area network 106 (e.g., the internet). Thus, the provider network 102 may be considered a remote provider network and may be in another physical location than the hub devices, such as another city, state, or country. As shown, the hub device 100 is also connected to a local network via one or more network components 108. One or more data source devices 110 (e.g., a type of edge device at the edge of the local network) are also connected to the local network via the network components 108.

Although a particular configuration of network components 108 and data source devices 110 is shown as an example, any other suitable combination of one or more network components 108 and one or more data source devices 100 may be used to form the local network. In some embodiments, one or more data source devices 110 may be capable of transmitting data to the hub device 100 without using any intermediate network components 108.

In embodiments, the network components 108 may be any type of router, computing device, switch, or other data processing device capable of receiving data from one device and sending the received data to another device (e.g., routing the data from one device to another). Thus, the hub device 100, the network components 108, and/or the data source devices 110 may each be connected to the same local network and considered part of the same local network. In various embodiments, one or more of the hub device 100, the network components 108, and/or the data source devices 110 may be capable of sending data via wire and/or via wireless transmission.

Each of the network components 108 may operate in accordance with a data transmission capacity or constraint. For example, the data transmission capacity or constraint may be a threshold limit that is the maximum amount of data that the network component 108 is capable of handling and/or transmitting over a period of time without becoming overloaded (e.g., a maximum bandwidth throughput constraint).

In some embodiments, each of the network components 108 may also operate in accordance with a power consumption constraint. For example, the power consumption constraint may be a threshold limit for the amount of power that the network component 108 can consume. In embodiments, the power consumption constraint may be based on capability of a battery to supply energy to the network component 108.

In embodiments, each of the data source devices 110 may operate in accordance with a power consumption constraint. For example, the power consumption constraint may be a threshold limit for the amount of power that the data source device 110 can consume. In embodiments, the power consumption constraint may be based on capability of a battery to supply energy to the data source device 110.

In various embodiments, each of the data source devices 110 may operate in accordance with a data transmission capacity or constraint. For example, the data transmission capacity or constraint may be a threshold limit that is the maximum amount of data that the data source device 110 is capable of handling and/or transmitting over a period of time without becoming overloaded (e.g., a maximum bandwidth throughput constraint for sending undiscarded data).

As shown in the depicted embodiment, each data source device 110 includes a data collector 112 and a data filter 114. The data collector 112 may include any suitable device for collecting and/or generating data and sending the data to the data filter 114. For example, the data collector 112 may be an environmental sensor device that detects one or more environmental conditions (e.g., temperature, humidity, etc.) and generates and/or collects environmental data based on the detected environmental conditions. Thus, the generated data may indicate one or more environmental conditions of the data source device 110 or the local network.

In embodiments, a data collector 112 may be a sensor or other device that detects performance and/or other operational aspects of the network (e.g., network bandwidth or traffic, power consumption of a data source device or network component, etc.) and generates data based on the detected performance. Thus, the generated data may indicate performance or other operational aspects of the local network, the data source device 110, and/or one or more network components 108.

In some embodiments, the data filter 114 receives the collected data from the data collector 112 and determines a portion of the collected data to be transmitted to the hub device 100 (e.g., a first portion of the collected data). In embodiments, the data filter 114 determines another portion of the collected data to be filtered from transmission to the hub device 100 (e.g., a second portion of the collected data). The first portion of the collected data may be any subset of the collected data (e.g., contiguous and/or non-contiguous portions of the collected data). In some cases, it may include all of the collected data. Similarly, the second portion of the collected data (the other portion) may be any subset of the collected data (e.g., contiguous and/or non-contiguous portions of the collected data). In some cases, it may include all of the collected data.

In some embodiments, the collected data is a time-series data set and the data filter 114 performs one or more operations on the time-series data set to generate the first portion of the data to be transmitted to the hub device 100. For example, the data filter 114 may calculate an average value based on two or more data values of the collected data in order to generate the first portion of the data to be transmitted.

In some embodiments, the hub device 100 discards the other portion of the collected data. In embodiments, to discard the data, the hub device performs one or more operations on the other portion of the collected data to prevent it from being transmitted to the hub device 100. For example, the other portion of data may be indicated, via metadata, as discarded data and/or the other portion of data may be deleted.

The data filter 114 may send the portion of the collected data (e.g., the first portion) to the hub device via the local network (e.g., via one or more of the network components 108). In some embodiments, the portion of the collected data may be any remaining portion of the collected data that was not filtered. In embodiments, the portion of the collected data that is sent to the hub device may be only a subset of the remaining portion of the collected data that was not filtered.

In embodiments, a given data filter 114 is configured (e.g., generated by the hub device 100 and/or the provider network 102) to filter the collected data with respect to a data transmission capacity or constraint of one or more network components 108 and/or with respect to a power consumption constraint of the data source device 110 that implements the given data filter 114. For example, the given data filter 114 may be configured to filter a sufficient portion of the collected data in order to prevent one or more of the network components 108 from being overloaded by network traffic. As another example, the given data filter 114 may be configured to filter a sufficient portion of the collected data in order to prevent the data source device 110 that implements the given data filter 114 from consuming a threshold amount of power.

In some embodiments, the power consumption constraints of the network components 108 and/or the data transmission capacity or constraint of the data source device 110 may also be taken into account for the configuration of the given data filter 114. For example, the given data filter 114 may also be configured to filter the collected data with respect to a data transmission capacity or constraint of the data source device 110 that implements the given data filter 114 and/or with respect to a power consumption constraint of one or more network components 108.

By filtering a sufficient portion of the collected data as described above, the local network (e.g., the hub device 100 and/or the network components 108 and/or the data source devices 110) may be prevented from becoming overloaded, may operate more efficiently, and/or may operate with fewer errors and less data loss. Moreover, the amount of energy for operating the local network (e.g., the hub device 100 and/or the network components 108 and/or the data source devices 110) may be reduced and kept below a threshold amount. By keeping the energy cost low or below a threshold, battery life for various devices may be prolonged and devices may operate more efficiently.

Figure 2:
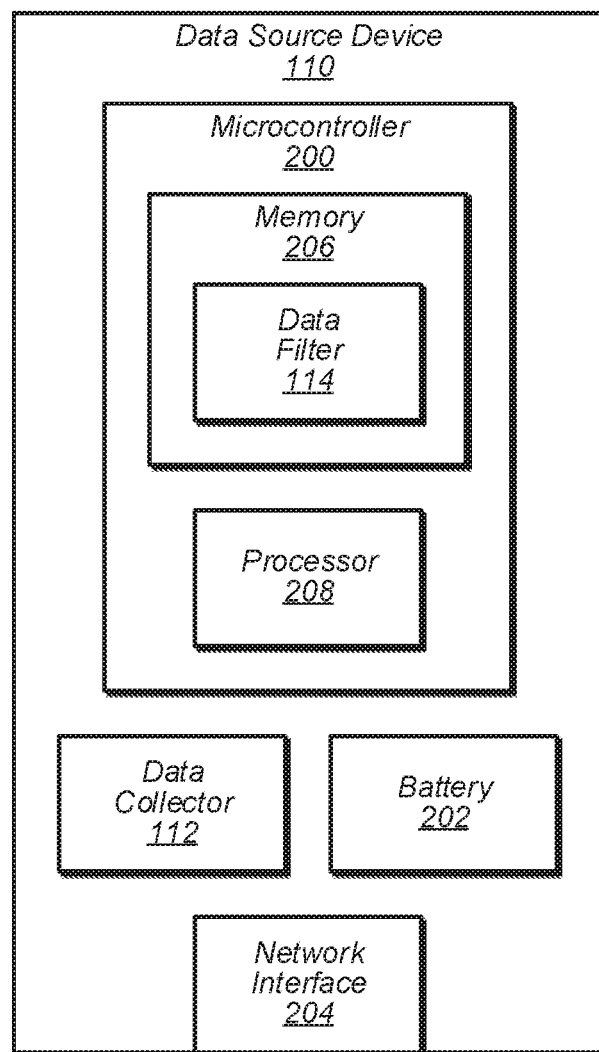
FIG. 2 is a block diagram of an example data source device that implements a data filter, according to some embodiments.

FIG. 2 is a block diagram of an example data source device 110 that implements a data filter 114, according to some embodiments. In the depicted embodiment, the data source device 110 include a microcontroller 200, a data collector 112, a battery 202, and a network interface 204. The microcontroller 200 includes a memory 206 and a processor 208.

The memory 206 includes a data filter 114. In embodiments, the data filter 114 may include a data partitioning scheme (e.g., a decision tree) that implements a set of rules for determining the other portion of collected data to be filtered from transmission to the hub device 100. In some embodiments, the data partitioning scheme includes executable instructions and the processor 208 executes the instructions in order to implement the rules and determine the other portion of data to be filtered from transmission. In various embodiments, any other suitable executable instructions of the memory 206 may be used to implement the filtering functionality of the data filter 114 described above.

In some embodiments, two or more different data filters 114 may include different data partitioning schemes that implement different respective rules for determining respective portions of data to be filtered from transmission to the hub device 100. In embodiments, two or more different data filters 114 may include the same data partitioning schemes that implement the same respective rules for determining respective portions of data to be filtered from transmission to the hub device 100.

In embodiments, the network interface 204 communicatively couples the data source device 110 to the local network. Thus, the data source device 110 transmits data to the hub device 100 via the network interface 204. In embodiments, the network interface 204 may transmit data via a wired or wireless interface.

In some embodiments, the microcontroller 200 and one or more of its components may be relatively lightweight compared to one or more microcontrollers used by the hub device 100. For example, the size of the memory 206 may be at least an order of magnitude smaller than the size of a memory (or multiple memories) used by the hub device 100. In embodiments, the lightweight nature of the data source device 110 and the microcontroller 200 allow for smaller power requirements for the local network. Also, the relative simplicity of the data filters 114 allow for a small memory footprint and lower processing power.

Figure 3:
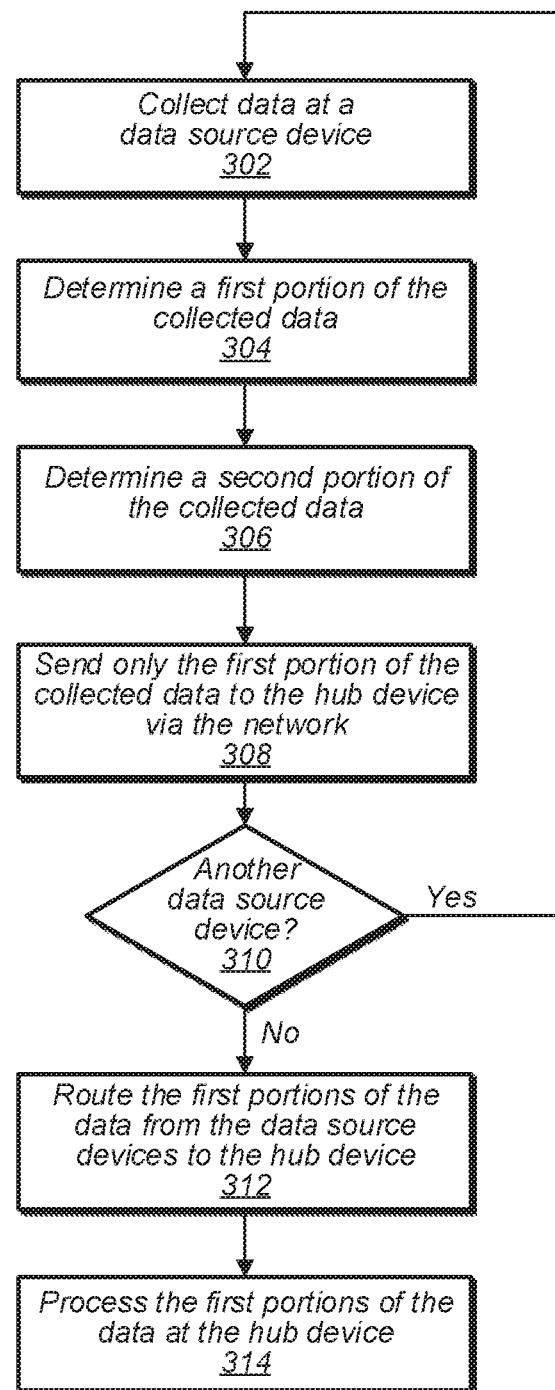
FIG. 3 is a flow diagram that illustrates filtering collected data and routing undiscarded data to a hub device, according to some embodiments.

FIG. 3 is a flow diagram that illustrates filtering collected data and routing undiscarded data to a hub device, according to some embodiments. At block 302, a data collector collects data at the data source device. At block 304, the data filter determines a first portion of the collected data. For example, the data filter determines a portion of the collected data to be transmitted to a hub device. At block 306, the data filter determines a second portion of the collected data. For example, the data filter determines another portion of the collected data to be filtered from transmission to the hub device.

At block 308, the data source device sends only the first portion of the collected data to the hub device via the local network. At block 310, if there is another data source device, then another data source device also performs the above steps to send additional undiscarded data to the hub device. In embodiments, each of the data source devices sends the portion of data to the hub device independent of the other data source devices (without waiting for any other data to be sent from other devices).

At block 312, the network components route respective portions of data from one or more of the data source devices to the hub device. At block 314, the hub device receives and processes the portions of data. As described above, the hub device may send a response or commands to one or more endpoints based on the processing of the portions of data.

Figure 4:
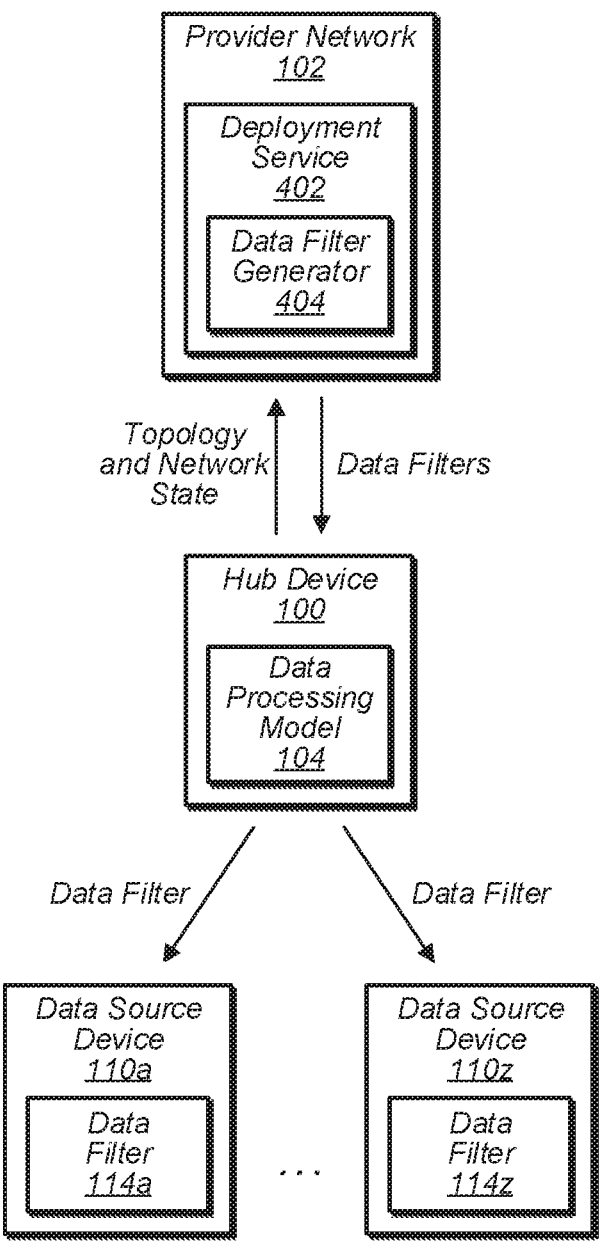
FIG. 4 is a block diagram of a hub device that receives data filters from a provider network and deploys the data filters to data source deices, according to some embodiments.

FIG. 4 is a block diagram of a hub device that receives data filters from a provider network and deploys the data filters to data source deices, according to some embodiments. The provider network 102 includes a deployment service 402 that generates data filters 114 for the data source devices 110 and transmits the data filters 114 to the hub device 100. The hub device 100 then transmits the data filters 114 to the respective data source devices 110.

In embodiments, the provider network 102 receives topology data from the hub device 100 and generates the data filters 114 based on the received topology data. In any of FIGS. 1-16, the topology data may include a topology of the network (e.g., identification of devices, communication paths between devices, etc.) and/or a state of the network, and/or the topology data may include a change in the topology of the network and/or the state of the network. In embodiments, the state of the network may include operational status of one or more devices (e.g., operational or failed), devices removed or new devices added, bandwidth used between two or more devices of the network, power consumed by two or more devices of the network, environmental conditions for the network and/or for one or more particular devices of the network, or any other suitable network state information.

In embodiments, the hub device 100 receives and/or generates the topology data based on data received from one or more components of the network. For example, the hub device 100 may receive data from the data source devices 110 and/or the network components 108. The topology data may indicate the one or more data source devices 110 and/or the network components 108 (e.g., data that identifies and/or describes the devices and/or components).

In some embodiments, the topology data may indicate one or more changes in the topology and/or performance of the local network. For example, the topology data may indicate changes in the number of and/or performance of one or more of the data source devices 110 and/or one or more of the network components 108. The hub device 100 may transmit the topology data to the provider network 102. The provider network 102 may generate one or more new or updated data filters 114 based on the topology data and send them to the hub device 100. In some cases, the provider network 102 instead generates modifications for existing data filters 114.

The hub device 100 may receive and then deploy the new or updated data filters 114 (or modifications) to respective data source devices 110. In embodiments, the new or updated data filters 114 replace respective existing data filters 114 at the data source devices 110. In other embodiments, modifications are used to update the existing data filters 114 (instead of replacement).

Figure 5:
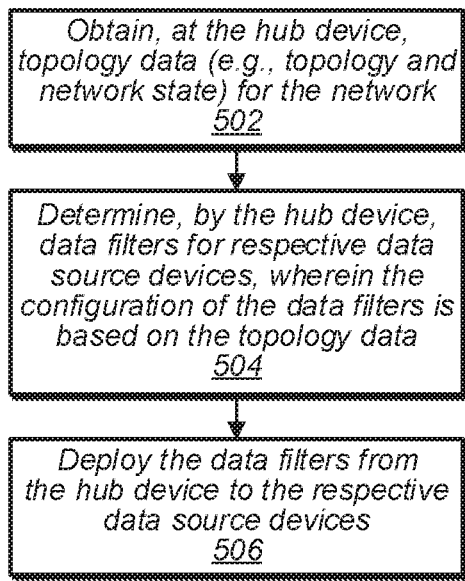
FIG. 5 is a flow diagram that illustrates obtaining topology data at a hub device, determining data filters for data source devices, and deploying the data filters to the data source devices, according to some embodiments.

FIG. 5 is a flow diagram that illustrates obtaining topology data at a hub device, determining data filters for data source devices, and deploying the data filters to the data source devices, according to some embodiments. At block 502, a hub device obtains topology data for the local network (e.g., topology and/or network state of the local network. In embodiments, the topology data may include data for one or more particular devices (e.g., data for network components and/or data source devices).

At block 504, the hub device determines one or more data filters for respective data source devices, wherein the configuration of the one or more data filters is based on the topology data. As explained for FIGS. 6A and 6B, the configuration and/or generation of the data filters may occur at the hub device or at a provider network. At block 506, the hub device deploys the data filters to respective data source devices.

Figure 6A:
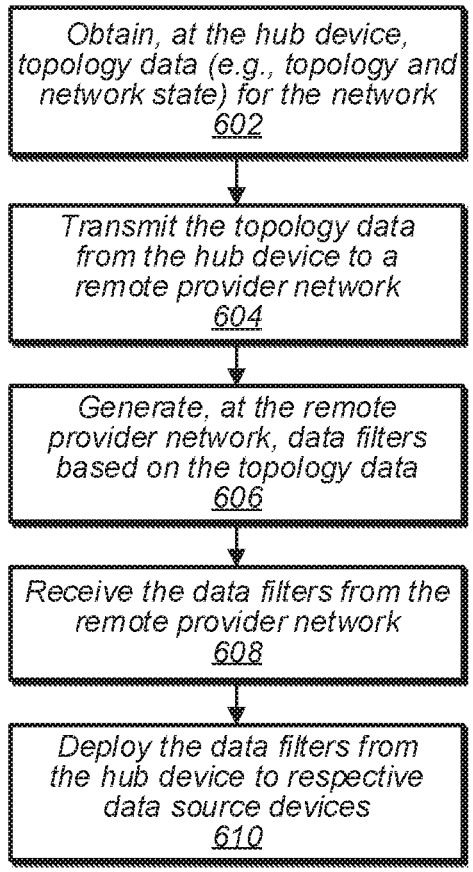
FIG. 6A is a flow diagram that illustrates obtaining topology data at a hub device, receiving data filters from a remote provider network, and deploying the data filters to the data source devices, according to some embodiments.

FIG. 6A is a flow diagram that illustrates obtaining topology data at a hub device, receiving data filters from a remote provider network, and deploying the data filters to the data source devices, according to some embodiments. At block 602, a hub device obtains topology data for the local network (e.g., topology and/or network state of the local network). In embodiments, the topology data may include data for one or more particular devices (e.g., data for network components and/or data source devices).

At block 604, the hub device transmits the topology data to a remote provider network. At block 606, the remote provider network generates data filters based on the topology data. At block 608, the hub device receive the data filters from the remote provider network. At block 610, the hub device deploys the data filters to respective data source devices.

Figure 6B:
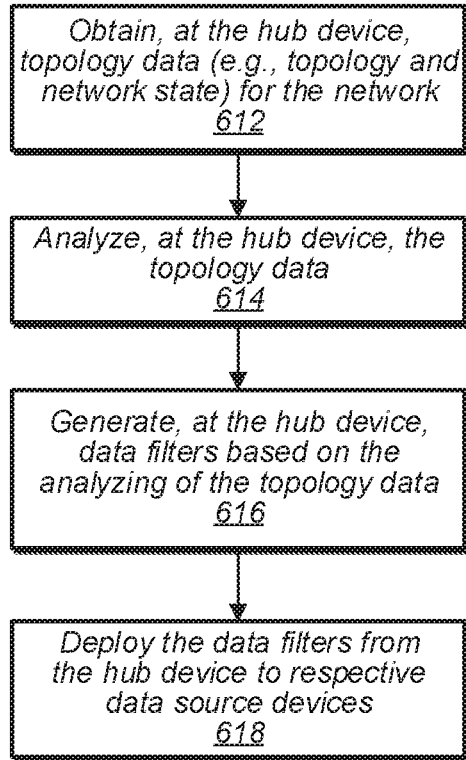
FIG. 6B is a flow diagram that illustrates obtaining topology data at a hub device, generating data filters at the hub device, and deploying the data filters to the data source devices, according to some embodiments.

FIG. 6B is a flow diagram that illustrates obtaining topology data at a hub device, generating data filters at the hub device, and deploying the data filters to the data source devices, according to some embodiments. At block 612, a hub device obtains topology data for the local network (e.g., topology and/or network state of the local network. In embodiments, the topology data may include data for one or more particular devices (e.g., data for network components and/or data source devices).

At block 614, the hub device analyzes the topology data. At block 616, the remote provider network generates data filters based on the analyzing of the topology data. At block 618, the hub device deploys the data filters to respective data source devices.

Figure 7:
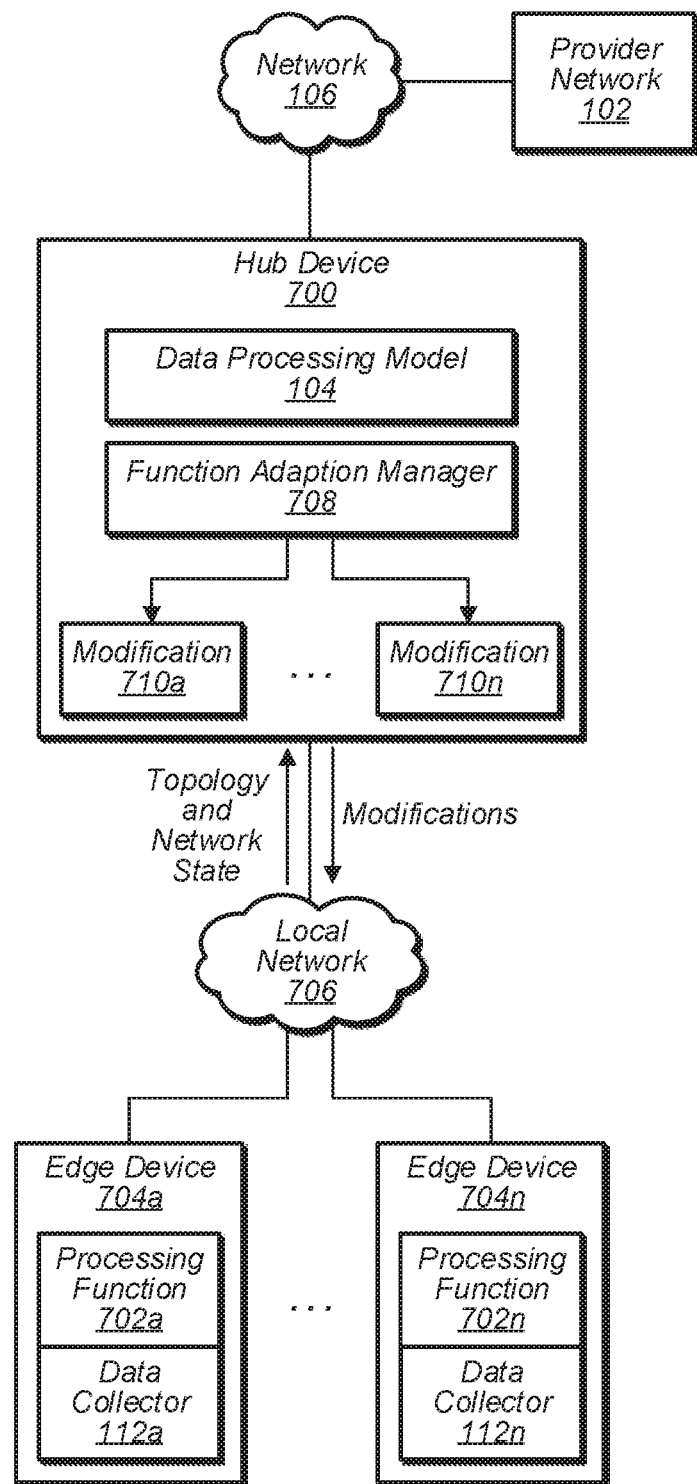
FIG. 7 illustrates a system for updating processing functions at edge devices, according to some embodiments.

FIG. 7 illustrates a system for updating processing functions at edge devices, according to some embodiments. The hub device 700, the provider network 102, edge devices, or any other devices depicted in FIG. 7 may be the same as or include one or more of the same components as the hub device, the provider network, edge devices, or any other components depicted in any of FIGS. 1-6B and 8-16, in embodiments. Similarly, the provider network, hub device, edge devices, or other components depicted in any of FIGS. 1-6B and 8-16 may be the same as or include one or more same components as the hub device 700, the provider network 102, edge devices, or any other components depicted in FIG. 7. The hub device 700 may be connected to the remote provider network 102 via the network, as described for the hub device 100 above.

In the depicted embodiment, the hub device 700 includes a data processing model 104 that may receive data from one or more sources and process the data. In embodiments, the data processing model 104 may receive data that has been processed by one or more processing functions 702 at one or more respective edge devices 704. The data processing model 104 may then perform one or more operations on the received data.

The data processing model 104 function in any of the ways described above. For example, the data processing model 104 may analyze the received data, modify the received data based on the analyzing, and/or generate a response based on the analyzing (e.g., new data, one or more commands, or some other result). The data collectors 112 may collect data and send the collected data to the processing functions at each of the edge devices 704.

In embodiments, a given processing function 102 may perform one or more operations on the collected data received from the data collector and generate processed data based on the one or more operations. For example, some or all of the collected data may be modified and/or filtered to generated processed data. The processed data may then be transmitted to the hub device 700 via the local network 706 (e.g., directly or via one or more components of the local network 706). Thus, the edge devices 704 and the hub device 700 are connected to the local network 700.

In the depicted embodiment, the hub device 700 includes a function adaptation manager 708 that determines one or more modifications 710 to respective processing functions 702 and deploys them to the respective edge devices 704 so the edge devices 704 can update the respective processing functions 702. As explained for FIGS. 9 and 11, the generation of the one or more modifications 710 may occur at the hub device 700 and/or at the provider network 102. In embodiments, the update to a given processing function 702 causes it to change how collected data is processed by the processing function.

For example, one or more of the operations performed on collected data may be changed or removed, and one or more new operations may be added. Thus, a given set of collected data may be modified in a different way or filtered in a different way such that the processed data is different before versus after the update to the processing function. In some embodiments, the processed data remains the same, but the processing function operates in a different way (e.g., faster, more efficient, etc.).

In embodiments, the one or more of the modifications 710 may increase a level of redundancy associated with the one or more respective processing functions 702. For example, one or more additional functions may be added to a particular processing function 702 that correspond to one or more other processing functions 702 of other edge devices 704. Thus, the particular processing function 702 may serve as a backup or redundant processing function. Thus, the fault tolerance and level of redundancy of the local network may be increased.

In embodiments, the function adaptation manager 708 receives topology data (e.g., topology and/or network state) from the local network (e.g., one or more of the edge devices 704 and/or other devices) and determines the one or more modifications 710 based on the topology data. As described above, the topology data may indicate one or more changes in topology of the network and/or one or more changes in performance of the network.

Figures 8, 9:
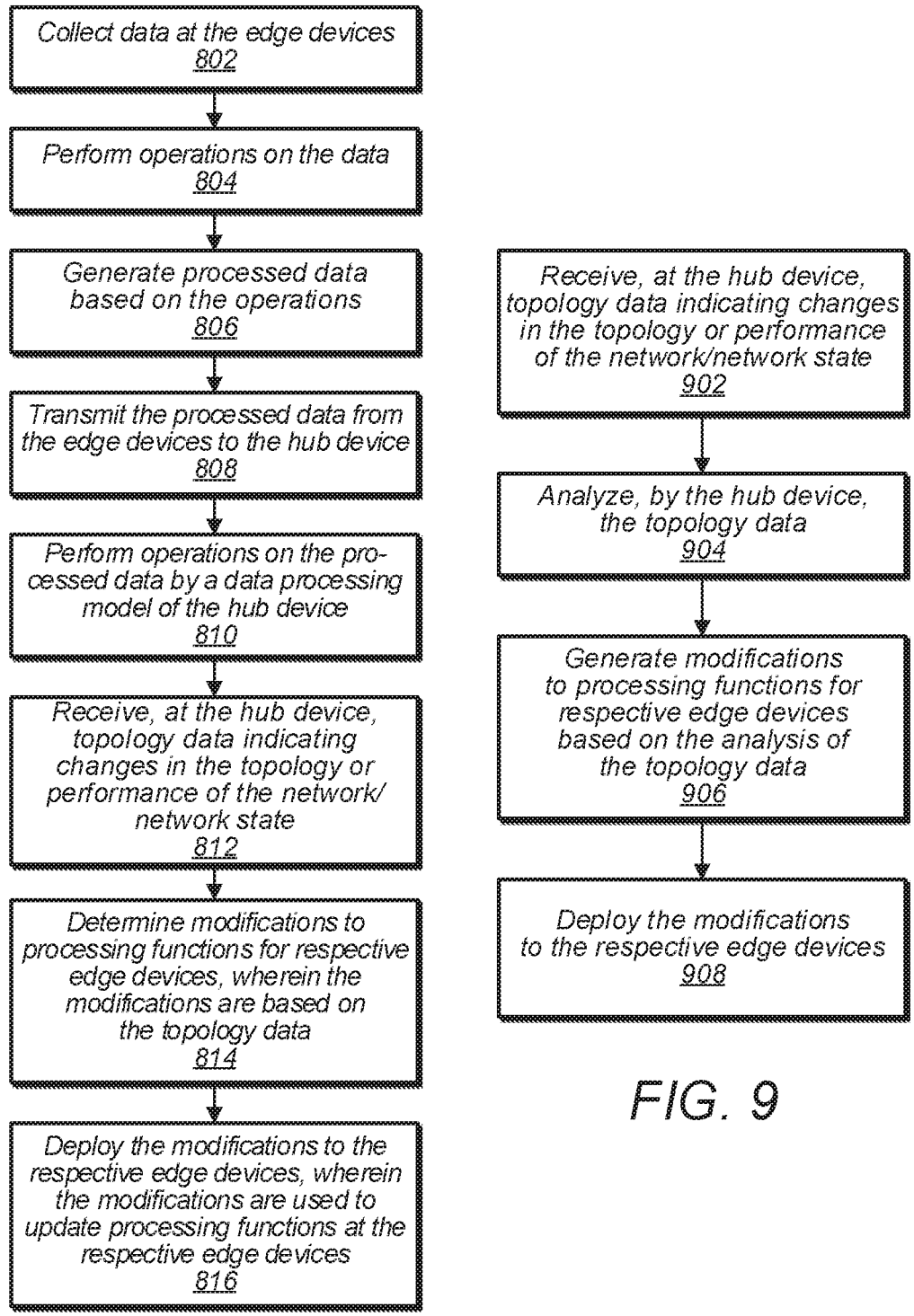
FIG. 8 is a flow diagram that illustrates processing data at edge devices and updating processing functions at the edge devices, according to some embodiments.
FIG. 9 is a flow diagram that illustrates generating and deploying modifications to processing functions, according to some embodiments.

FIG. 8 is a flow diagram that illustrates processing data at edge devices and updating processing functions at the edge devices, according to some embodiments. At block 802, the data collectors collect data at the respective edge devices and send the data to the respective processing functions at each edge device.

At block 804, the processing functions perform operations on the respective collected data. At block 806, the processing functions generate respective processed data based on the operations. At block 808, each of the processing functions transmits the respective processed data to the hub device.

At block 810, a data processing model at the hub device receives the processed data and performs one or more operations on the processed data. At block 812, the function adaptation manager receives topology data indicating changes in topology or performance of the local network/network state. At block 814, the function adaptation manager determines one or more modifications to processing functions for respective edge devices, wherein the modification are based on the received topology data. As explained for FIGS. 9 and 11, the generation of the one or more modifications may occur at the hub device and/or at the remote provider network.

At block 816, the function adaptation manager deploys the one or more modifications to the respective edge devices, wherein the modifications are used to update processing functions at the respective edge devices. In embodiments, the modifications may include different modifications for the same processing function at two or more different edge devices. In some embodiments, the modifications include the same modification for the same processing function at two or more different edge devices.

FIG. 9 is a flow diagram that illustrates generating and deploying modifications to processing functions, according to some embodiments. At block 902, the function adaptation manager at the hub device receives topology data indicating changes in topology or performance of the local network/network state. In embodiments, the topology data is received from one or more of the edge devices and/or one or more other devices that collect and/or generate the topology data.

At block 904, the function adaptation manager analyzes the topology data. In embodiments, the analyzing includes performing one or more operations on the topology data. At block 906, the function adaptation manager generates modifications to processing functions for respective edge devices based on the analysis of the topology data. At block 908, the function adaptation manager deploys the modifications to the respective edge devices.

Figure 10:
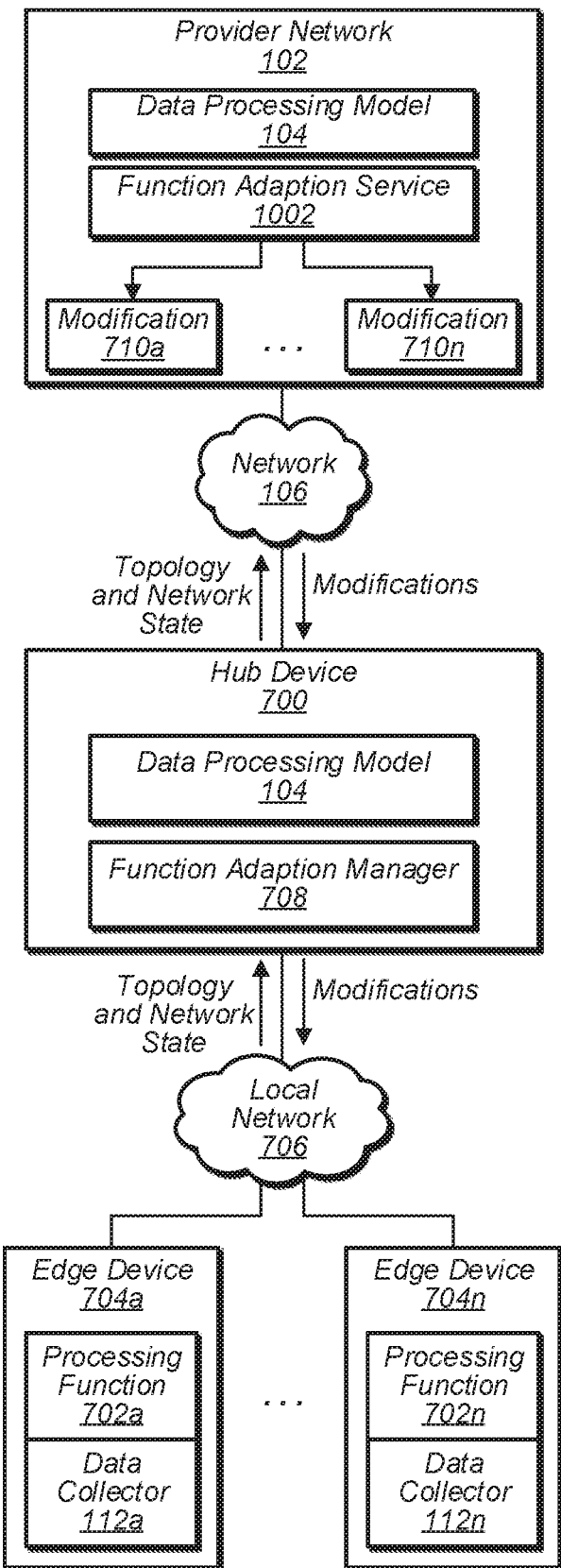
FIG. 10 illustrates a system for generating and deploying modifications to processing functions, according to some embodiments.

FIG. 10 illustrates a system for generating and deploying modifications to processing functions, according to some embodiments. In the depicted embodiment, a function adaptation service 1002 of the provider network 102 performs the same or similar functions as described for the function adaptation manager 708 of FIG. 7.

The function adaptation service 1002 may receive topology data from the hub device 700 of the remote network. The topology data may indicate one or more changes in a topology or performance of the remote network/network state. In embodiments, the topology data may be the same type of data as the topology data described for FIG. 7 and may be obtained by the hub device in the same or similar way as described for FIG. 7.

In embodiments, the function adaptation service 1002 analyzes the topology data. The analyzing may include performing one or more operations on the topology data. The function adaptation service 1002 may then generate one or more modifications 710 to processing functions 702 based on the analysis of the topology data. In embodiments, the one or more modifications 710 are configured for updating one or more processing functions 702 at the respective one or more edge devices 704 connected to the network.

In some embodiments, the modifications 710 are configured to reduce an amount of power consumed by the respective edge devices 704. Thus, energy costs may be reduced and batteries used by the edge device 704 may be used for a longer period of time before replacement or recharging.

In embodiments, the modifications 710 are configured to reduce an amount of network bandwidth consumed by the respective edge devices 704. Thus, the edge devices 704 and/or other network components that transmit data from the edge devices 704 to the hub device 700 may operate more efficiently and be prevented from overloading due to network traffic.

The function adaptation service 1002 then transmits the modifications 710 to the hub device 700. The hub device 700 may then deploy the modifications 710 to the respective edge devices 704. In some embodiments, the function adaptation service 1002 instead transmits at least some of the modifications 710 directly to respective edge devices 704 (e.g., via wired and/or wireless transmission). In such cases the function adaptation service 1002 may also receive the topology data directly from the respective edge devices 704 instead of via the hub device 700.

In embodiments, the modifications 710 are configured to replace respective processing functions 702. Thus, a modification 710 may include a new processing function 702 to replace an existing processing function 702. In other embodiments, the modifications 710 are configured to only modify a portion of an existing processing function 702. In some cases, for a particular deployment, one or more of the modifications 710 are configured to replace existing processing functions, while the remaining modifications 710 only modify a portion of existing processing functions.

In some embodiments, after the hub device 700 receives the modifications 710 from the provider network 102, the function adaptation manager 708 may perform additional changes or updates to one or more of the modifications 710 before deploying them to the respective edge devices 704. For example, the function adaptation manager 708 may analyze at least some of the topology data and update one or more of the modifications 710 based at least on the analyzing.

In embodiments, the topology data used by the function adaptation manager 708 to perform the additional changes or updates to the modifications 710 may be the same as that used by the function adaptation service 1002. However, in other embodiments, the topology data used by the function adaptation manager 708 may be different. For example, the topology data may be more recently obtained data that indicates more recent changes to topology and/or performance of the network. Thus, the additional changes or updates to the modifications 710 may configure them to be better adapted to the current or more recent state of the network.

In some embodiments, after the one or more processing functions 702 are updated, the hub device 700 receives additional topology data indicating one or more additional changes in the performance of the network. The hub device 700 may then determine one or more additional modifications 710 to processing functions 702 for one or more of the respective edge devices 704, wherein the one or more additional modifications are based on the additional topology data. As described above, the generating of the one or more additional modifications 710 may be performed by the function adaptation service 1002 and/or the function adaptation manager 708. The function adaptation manager 708 may then deploy the one or more additional modifications 710 to the one or more respective edge devices 704.

In embodiments, the above process of determining one or more additional modifications 710 to processing functions 702 and deploying additional modifications 710 may be repeated any number of times. Thus, the function adaptation service 1002 and/or the function adaptation manager 708 may continuously adapt the local network to more efficiently operate as changes occur in the topology and/or performance of the local network. Therefore, the function adaptation service 1002 and/or the function adaptation manager 708 may implement a reinforcement learning technique to improve the performance of the local network.

For example, if performance of one or more particular edge devices of the local network has decreased or changed by a threshold amount (e.g., traffic congestion or network bandwidth consumption exceeds a threshold amount, lost data or network errors exceeds a threshold amount, or power consumed by an edge device exceeds a threshold amount), then the function adaptation service 1002 and/or the function adaptation manager 708 may generate and deploy modifications to the particular edge devices to increase the performance of the particular edge device (e.g., by increasing or decreasing the volume of processed data that is sent from the particular edge devices to the hub device).

In some embodiments, the provider network 104 also includes a data processing model 104 that performs in the same or similar way as described above for the data processing model 104 of the hub device 700. Thus, the data processing model 104 of the provider network 102 may receive data from the edge devices 704 and process the received data. Moreover, in some embodiments, the data processing model 104 of the provider network 102 may be larger in size, computationally faster, and/or more accurate with respect to results. In some embodiments, the data processing model 104 of the provider network 102 may perform additional computations and/or use larger data sets to provide more accurate results.

Figure 11:
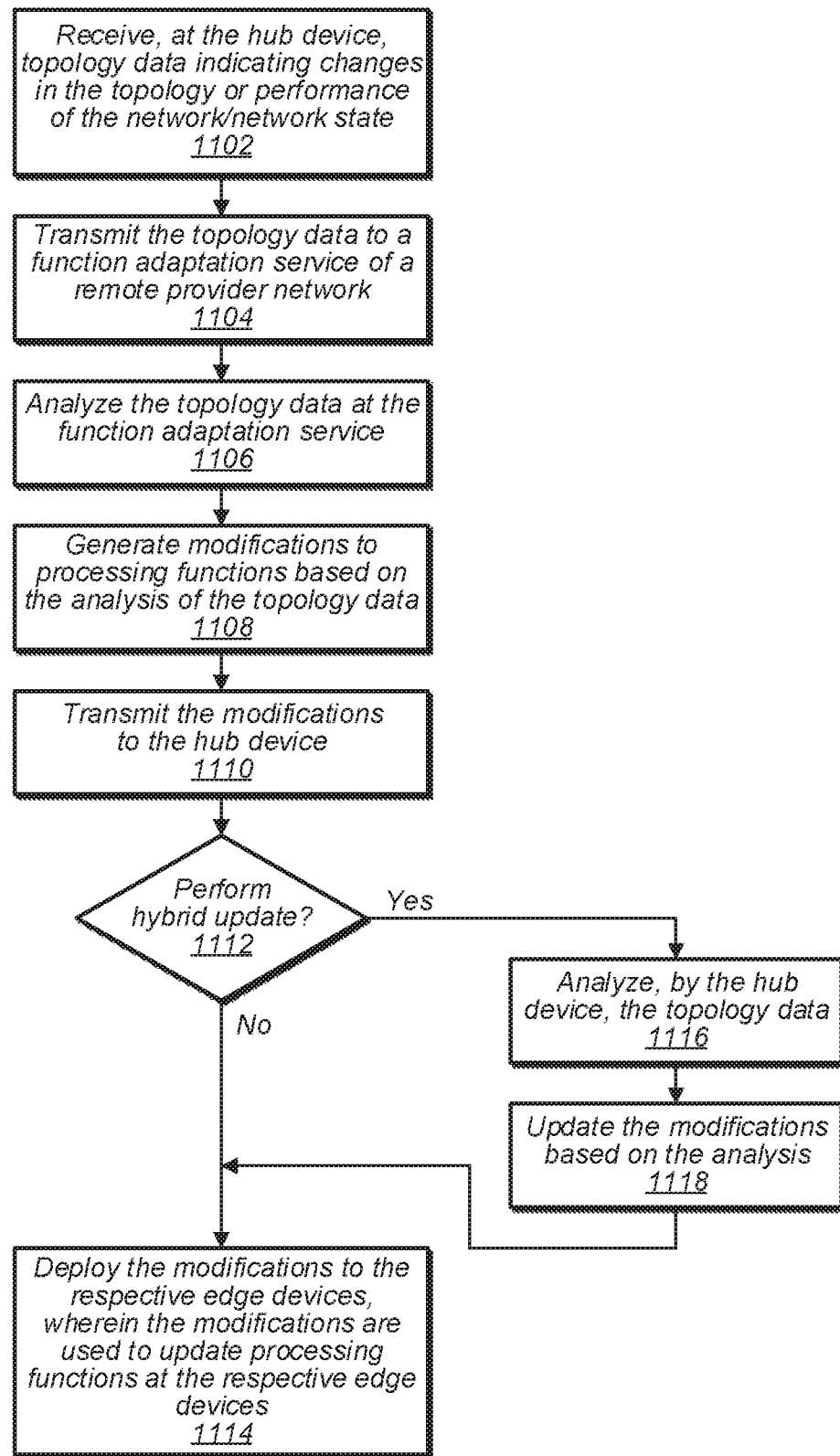
FIG. 11 is a flow diagram that illustrates generating and deploying modifications to processing functions, according to some embodiments.

FIG. 11 is a flow diagram that illustrates generating and deploying modifications to processing functions, according to some embodiments. At block 1102, the hub device receives topology data that indicates changes in the topology and/or changes in the performance of the local network/network state.

At block 1104, the function adaptation manager transmits the topology data to a function adaptation service of the remote provider network. At block 1106, the function adaptation service analyzes the topology data. At block 1108, the function adaptation service generates modifications to processing functions based on the analysis of the topology data. At block 110, the function adaptation service transmits the modifications to the hub device.

At block 1112, the function adaptation manager determines whether to perform a hybrid update. If not, then the function adaptation manager deploys the modifications to respective edge devices. The modifications are then used to update the processing functions at the respective edge devices. For example, the edge devices apply the modifications to the processing functions.

Figure 12:
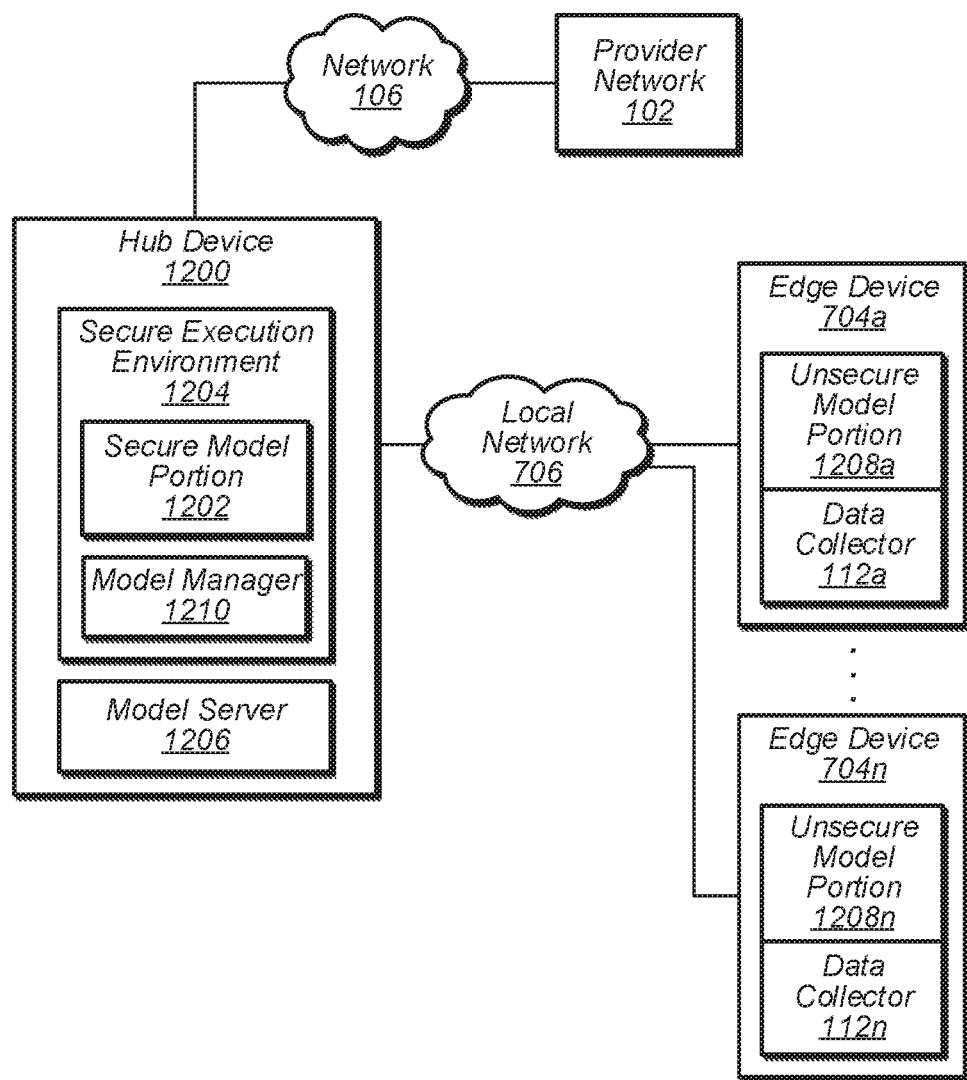
FIG. 12 illustrates a system for implementing a secure portion of a model and unsecure portions of the model, according to some embodiments.

FIG. 12 illustrates a system for implementing a secure portion of a model and unsecure portions of the model, according to some embodiments. The hub device 1200, the provider network 102, edge devices, or any other devices depicted in FIG. 12 may be the same as or include one or more of the same components as the hub device, the provider network, edge devices, or any other components depicted in any of FIGS. 1-11 and 13-16, in embodiments. Similarly, the provider network, hub device, edge devices, or other components depicted in any of FIGS. 1-11 and 13-16 may be the same as or include one or more same components as the hub device 1200, the provider network 102, edge devices, or any other components depicted in FIG. 12. The hub device 1200 may be connected to the remote provider network 102 via the network, as described for the hub device 100 above.

In the depicted embodiment, the hub device 1200 includes a secure model portion 1202 of a data processing model that is implemented in a secure execution environment 1204, and a model server 1206 that is implemented outside of the secure execution environment 1204. As described below, the secure execution environment 1204 prevents access to the secure model portion 1202 from outside of the secure execution environment 1204. In embodiments, the secure execution environment 1204 includes a trusted platform module (TPM) and/or another hardware module configured to implement the secure model portion 1202 and to prevent access to the secure model portion 1202 from outside of the secure execution environment 1204.

One or more unsecure model portions 1208 of the data processing model are at one or more respective edge devices 704. The data collectors 112 may function in the same way or in a similar way as those described in the figures above, in order to send collected data to the respective unsecure model portions 1208. In the example embodiment, the unsecure model portions 1208 are portions of the same data processing model as the secure model portion 1202. As described below, the data processing model is divided into the secure model portion 1202 and the one or more unsecure model portions 1208.

In embodiments, the model server 1206 receives the secure model portion 1202 and the unsecure model portions 1208 of the data processing model from the provider network 102, wherein at least the secure model portion 1202 is encrypted. In embodiments, the model server 1206 splits the received data processing model into the secure model portion 1202 and the unsecure model portions 1208. The model server 1206 deploys the unsecure model portions 1208 to respective edge devices 704 and sends the secure model portion 1202 to the secure execution environment 1204, where it is decrypted. In embodiments, the model manager 1210 in the secure execution environment receives the secure model portion 1202 and decrypts it.

In embodiments, the model manager 1210 may monitor calls (e.g., application programming interface (API) calls) to the secure model portion 1202 and perform one or more operations or actions to prevent a model extraction attack on the secure model portion. For example, the model manager 1210 may throttle calls to the secure model portion or block one or more calls to the secure model portion based on monitoring and/or detecting calls to the secure model portion 1202. In embodiments, the model manager 1210 may throttle calls to the secure model portion or block one or more calls to the secure model portion in response to determining that a number of calls exceeds a threshold number during a predetermined time period (e.g., number of calls per second) or in response to determining that a pattern of calls indicates a model extraction attack. In some embodiments, the model manager 1210 may track the number of calls made per user and determine an amount to bill individual users based on the number of calls made per user.

After the unsecure model portions 1208 are implemented at the edge devices 704, the data collectors 112 collect data and send the collected data to the unsecure model portions 1208 for processing. The unsecure model portions 1208 perform one or more operations on the collected data at respective edge devices 704 to generate processed data. The edge devices 704 transmit some or all of the processed data to the hub device 1200 for further processing.

In embodiments, the secure model portion 1202 includes one or more higher layers of a neural network (e.g., deep neural network) and the one or more unsecure model portions include one or more lower layers of the neural network. However, any other data processing models, computational models, machine learning models, or artificial intelligence models suitable for being split into two or more portions may be used to generate the secure model portion and the one or more unsecure model portions (e.g., deep neural networks, static or dynamic neural networks, memory networks, etc.). Moreover, in embodiments, any of the above data processing models or computational models may be used as the data processing model of any of FIGS. 1-16.

In the depicted embodiment, the secure model portion 1202 receives the processed data from the unsecure portions 1208. The secure model portion 1202. The hub device 1200 implements and/or executes the secure model portion 1202 in the secure execution environment 1204 to processes the data received from the unsecure portions 1208 to generate a result. The secure model portion 1202 and/or the hub device may then transmit the result to one or more endpoints (e.g., the provider network 102, one or more edge devices 704, and/or one or more other devices).

In some embodiments, any of the data processing models of the hub device described in FIGS. 1-16 may operate within the context of a reinforcement learning process. For example, the provider network and/or hub device may obtain topology data from the local network at multiple points in time (e.g., on a periodic basis) and based on the topology data, periodically modify or replace data filters, processing functions, or unsecure model portions to improve performance of the network.

In embodiments, the reinforcement learning process is used to obtain a sufficient amount of information to achieve an objective while also minimizing network traffic and/or power consumption by edge devices and/or other network components. For example, an objective for the reinforcement learning process may be to keep one or more rooms within a particular temperature range while minimizing network traffic and/or power consumption by edge devices and/or other network components.

Smart city sensors may also leverage data processing models and/or reinforcement learning techniques. For example, microphones and/or cameras may be deployed throughout a city to monitor and identify events (e.g., identify people, identify sounds such as gunshots or car wrecks, etc.). Since there may be a large number of sensors deployed throughout the city, it would be useful to reduce network traffic and to reduce power consumption by sensing devices while maintaining a threshold amount of monitoring (e.g., a threshold number of sensing devices activated).

In some embodiments, any of the data processing models of the hub device described in FIGS. 1-16 may operate within the context of an event-driven execution environment. For example, one or more functions of the data processing model may be assigned to respective events, such that a particular function is triggered in response to detection, by the event-driven execution environment, of an event assigned to the particular function (e.g., receiving data from one or more particular edge devices).

Figure 13:
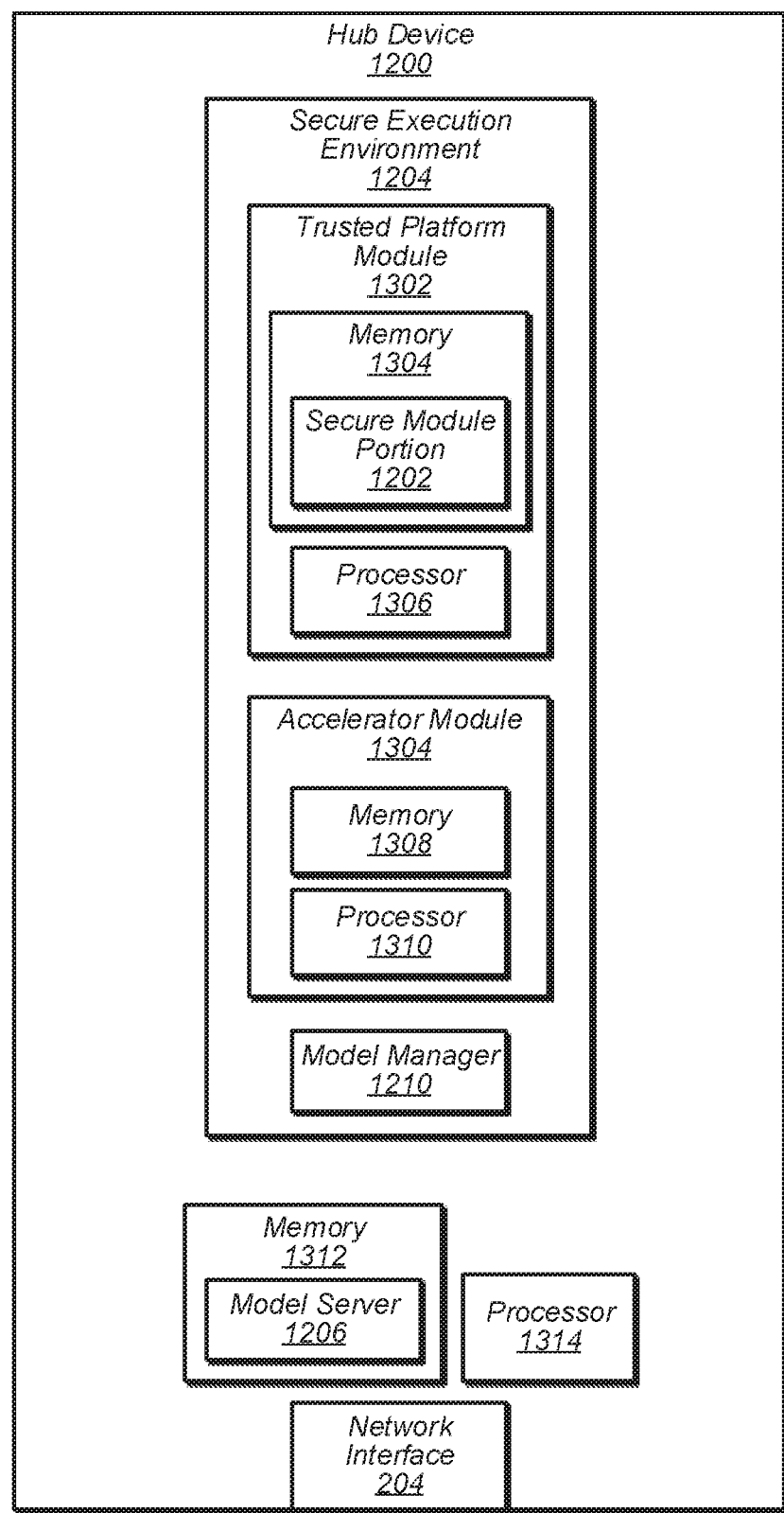
FIG. 13 illustrates a device for implementing a secure portion of a model, according to some embodiments.

FIG. 13 illustrates a device for implementing a secure portion of a model, according to some embodiments. In the depicted embodiment, the hub device 1200 includes a TPM 1302 and an accelerator module 1304 that together provide the secure execution environment 1204. In embodiments, the one or more additional hardware components (TPMs, accelerator modules, etc.) may also be used to implement the secure execution environment 1204. In some embodiments, the TPM 1302 itself or the accelerator module 1304 itself may implement the secure execution environment 1204.

As shown, the model manager 1210 executes within the secure execution environment 1204. In embodiments, the model manager 1210 by execute on one or more hardware components (e.g., processors and/or memory) other than the TPM 1302 and the accelerator module 1304. In some embodiments, at least a portion of the model manager 1210 may execute within the TPM 1302 and/or the accelerator module 1304.

As shown the TPM 1302 includes a secure memory 1304 that stores the decrypted secure model portion 1202 and a secure processor 1306 that may implement some or all of the secure model portion 1202. For example, the secure model portion 1202 may include computer-executable instructions, at least some of which are executed by the processor 1306. In embodiments, the TPM 1302 is configured to prevent access to the secure model portion 1202 from outside of the secure execution environment 1204 (e.g., by one or more devices outside of the secure execution environment 1204).

In the depicted embodiment, the accelerator module 1304 includes a secure memory 1308 and a secure processor 1310. The accelerator module 1304 may implement some or all of the secure model portion 1202. For example, processor 1310 may execute at least some of the computer-executable instructions of the secure model portion 1202, which may be stored in the memory 1308. In some embodiments, the processor 1310 of the accelerator module 1304 may share the same secure memory as the TPM (e.g., memory 1304).

Thus, in embodiments, the accelerator module 1304 may be used to perform one or more operations to process data according to the secure model portion 1202 more quickly and/or more efficiently than the TPM 1302 would be able to. The memory 1308 and the processor 1310 of the accelerator module 1304 may be configured to prevent access to the secure model portion 1202 from outside of the secure execution environment 1204.

The hub device 1200 also includes a memory 1312 that includes the model server 1206. In embodiments, the processor 1314 may execute computer-executable instructions of the model server 1206 that are stored in the memory 1312. Thus, the model server 1206 may at least temporarily store the secure model portion 1202 when it is encrypted, the unsecure model portions 1208, and any other data that does not need to be protected within the secure execution environment 1204.

In embodiments, the network interface 204 communicatively couples the hub device 1200 to the local network. Thus, the hub device receives processed data from the respective unsecure model portions 1208 via the network interface 204. In embodiments, the network interface 204 may receive and/or transmit data via a wired or wireless interface.

Figure 14:
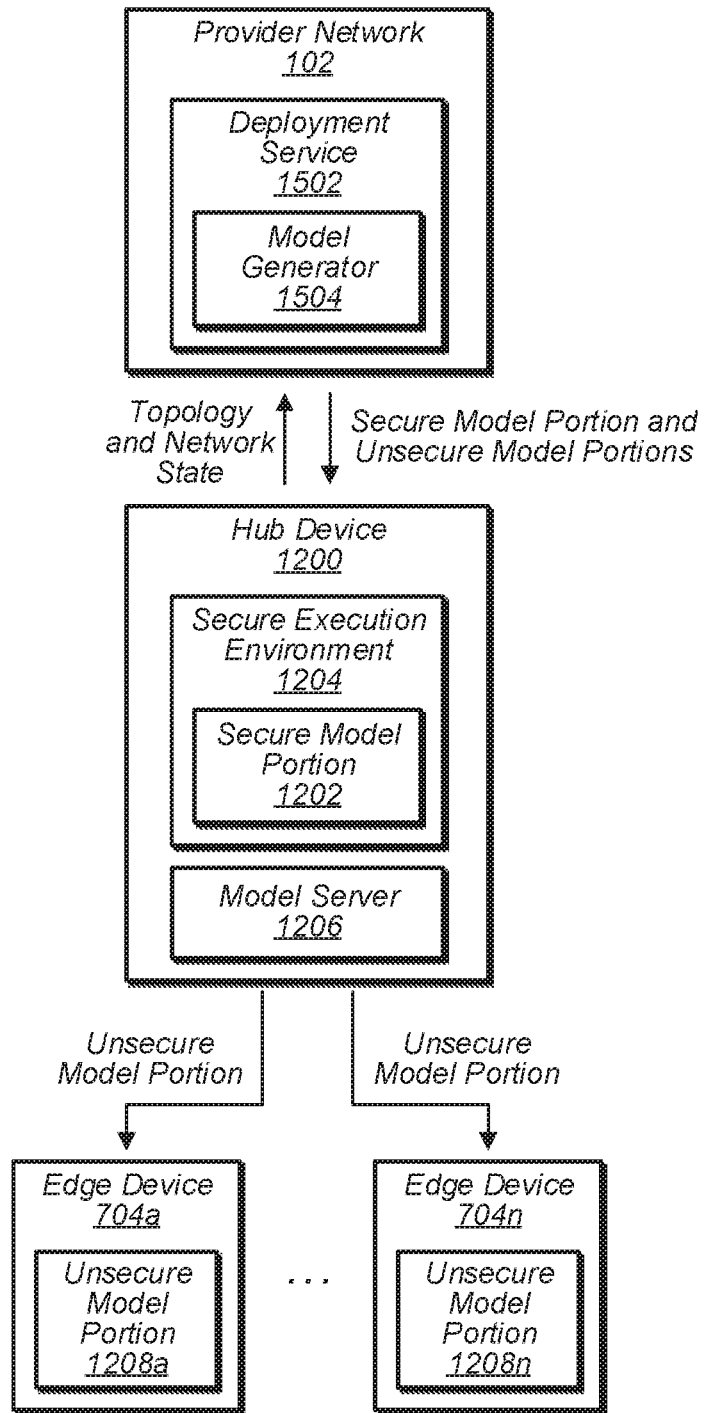
FIG. 14 is a block diagram of a hub device that receives a model from a provider network and deploys unsecure model portions to edge devices, according to some embodiments.

FIG. 14 is a block diagram of a hub device that receives a model from a provider network and deploys unsecure model portions to edge devices, according to some embodiments. As shown, the provider network 102 includes a deployment service 1502 that generates the data processing model, including the secure model portion 1202 and one or more unsecure model portions 1208. The deployment service 1502 transmits the secure model portion 1202 and one or more unsecure model portions 1208 to the hub device 1200. The hub device 1200 deploys unsecure model portions 1208 to the respective edge devices 704.

In embodiments, the provider network 102 receives topology data from the hub device 1200 and generates the secure model portion 1202 and one or more unsecure model portions 1208 based on the received topology data. In embodiments, the hub device 1200 receives and/or generates the topology data based on data received from one or more components of the network. For example, the hub device 1200 may receive data from the edge devices 704 and/or network components 108. The topology data may indicate the topology of the local network, including the one or more edge devices 704, network components 108, and or the hub device 1200 (e.g., data that identifies and/or describes the devices and/or components).

In some embodiments, the topology data may indicate one or more changes in the topology and/or performance of the local network. For example, the topology data may indicate changes in the number of and/or performance of one or more of the data source devices 110 and/or one or more of the network components 108. The hub device 100 may transmit the topology data to the provider network 102. The provider network 102 may generate the secure model portion 1202 and one or more unsecure model portions 1208 based on the topology data and send them to the hub device 100.

In embodiments, the provider network 102 encrypts the secure model portion 1202 before transmitting it to the hub device 1200. In some embodiments, the entire data processing model is encrypted before transmitting it to the hub device 1200, which includes the unsecure model portions 1208.

In some embodiments, the deployment service 1402 authenticates the hub device 1200 before receiving the topology data and/or before transmitting the secure model portion 1202 and one or more unsecure model portions 1208 to the hub device 1200. To authenticate the hub device 1200, the deployment service 1402 may receive security data from the hub device (e.g., certificate, token, password, and/or other security data), and authenticate the hub device 1200 based at least on the security data and/or security information stored at the provider network 102 that corresponds to the hub device 1200.

Figure 15:
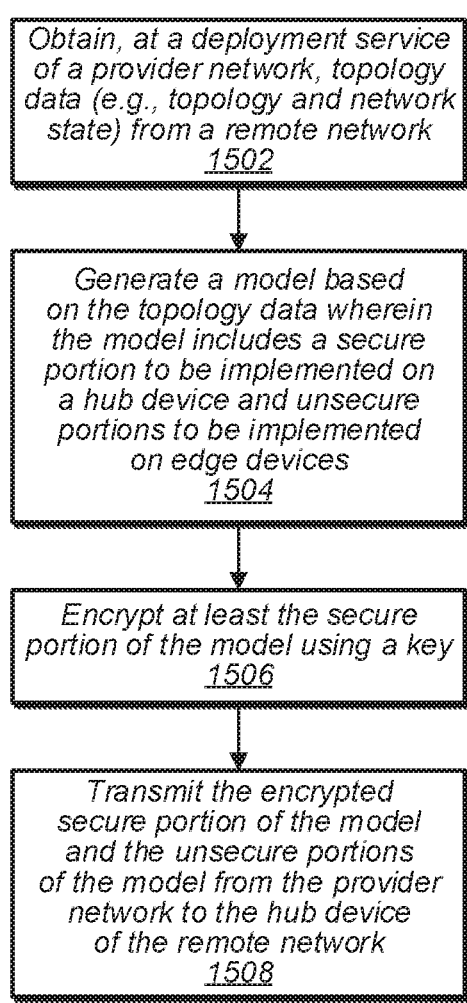
FIG. 15 is a flow diagram that illustrates generating and transmitting a model to a remote network, according to some embodiments.

FIG. 15 is a flow diagram that illustrates generating and transmitting a model to a remote network, according to some embodiments. At block 1502, the deployment service at the remote provider network obtains topology data from the local network. For example, the hub device collect the topology data from one or more network components and/or edge devices and transmit it to the deployment service.

At block 1504, the deployment service generates a data processing model based on the topology data. The model may include a secure model portion to be implemented on the hub device and one or more unsecure model portions to be implemented on respective edge devices. The deployment service then encrypts the secure model portion using a key at block 1506. In embodiments, the deployment service may also encrypt the unsecure model portions. In some embodiments, the entire data processing model may be encrypted and sent as one encrypted package.

At block 1508, the deployment service transmits the encrypted secure portion of the data processing model and the unsecure portions of the data processing model to the hub device of the remote network. In embodiments, the encrypted secure portion and the unsecure portions may be sent in separate transmissions at different points in time. In some cases, the encrypted secure portion and the unsecure portions are sent together in one transmission (e.g., as one package).

Figure 16:
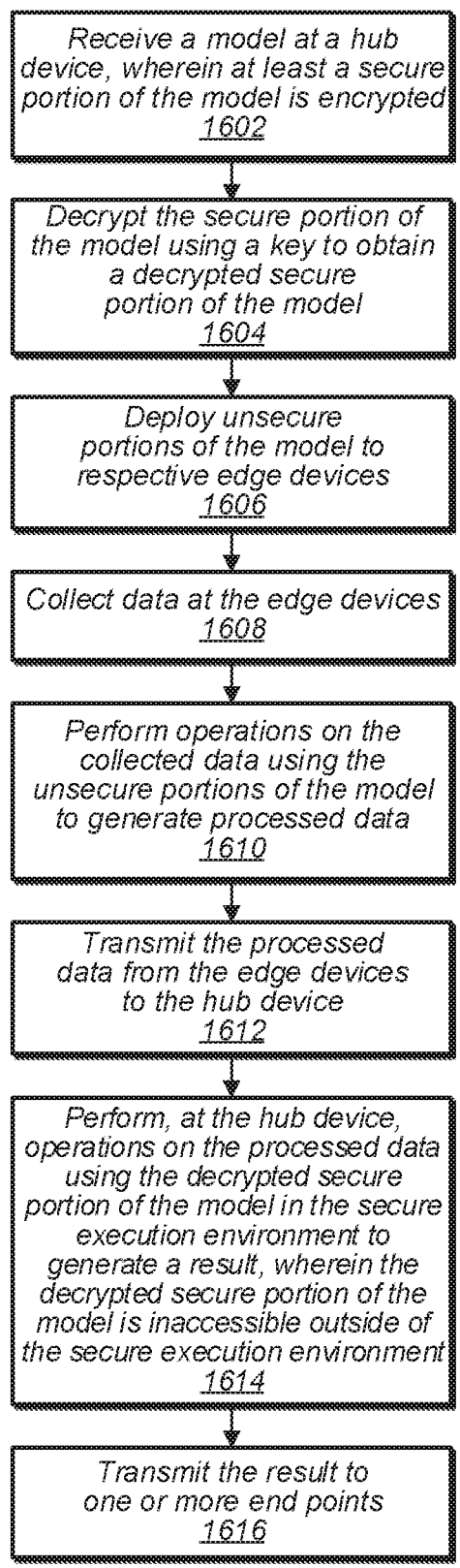
FIG. 16 is a flow diagram that illustrates deploying unsecure portions of a model to edge devices and performing operations on data using a secure portion of the model, according to some embodiments.

FIG. 16 is a flow diagram that illustrates deploying unsecure portions of a model to edge devices and performing operations on data using a secure portion of the model, according to some embodiments. At block 1602, the deployment manage receives the data processing model. As described above, at least the secure portion of the data processing model is encrypted.

At block 1604, the model server sends the encrypted secure portion to the secure execution environment. The TPM decrypts the secure portion of the data processing model using a key to obtain the decrypted secure portion. In embodiments, the TPM uses an encryption key stored in TPM memory or stored in any other suitable portion of the TPM to decrypt the secure portion. In some embodiments, the key stored in the TPM is a private key that is also used by the provider network to encrypt the secure portion at the provider network before sending it to the hub device.

In some embodiments, the secure execution environment receives the entire data processing model as an encrypted model. The secure execution environment decrypts the data processing model, which generates multiple decrypted portions of the model. The secure execution environment may then identify one of the decrypted portions of the model as the secure model portion to remain in the secure execution environment.

In embodiments, the secure execution environment may identify a decrypted portion of the model as the secure model portion based on metadata received from the provider network. In some embodiments, the secure execution environment may identify decrypted portions of the model as the one or more unsecure model portions based on metadata received from the provider network.

In various embodiments, metadata is transmitted with the encrypted data processing model to the hub device. The metadata itself may or may not be encrypted. After the data processing model and metadata is decrypted, the metadata may identify the secure portion of the data processing model to be implemented on the hub device and/or the one or more unsecure portions of the data processing model to be implemented on one or more respective edge devices.

In response to identifying the secure model portion and/or the one or more unsecure model portions, the secure execution environment may send the one or more unsecure model portions to the model server. The model server may then deploy the one or more unsecure model portions to respective edge devices.

At block 1606, the model server deploys the unsecure model portions to respective edge devices. At block 1608, data collectors at the edge devices collect respective data. At block 1610, the edge devices perform operations on the respective collected data using the unsecure portions of the model to generate processed data.

At block 1612, the unsecure model portions transmit the processed data from the respective edge devices to the hub device (e.g., via one or more network components). At block 1614, the hub device performs one or more operations on the processed data using the decrypted secure model portion in the secure execution environment to generate a result. In embodiments, the decrypted secure model portion is inaccessible outside of the secure execution environment. For example, the decrypted secure model portion may be inaccessible by one or more devices outside of the secure execution environment (e.g., to prevent model extraction attacks). In embodiments, one or more hardware features and/or software security features of the TPM prevents access to the secure execution environment by one or more devices outside of the secure execution environment.

At block 1616, the hub device and/or secure model portion transmits the result to one or more endpoints. In embodiments, the result may be one or more commands configured to cause one or more devices to perform an action (e.g., sound an alarm, turn on lights, etc.).

Figure 17:
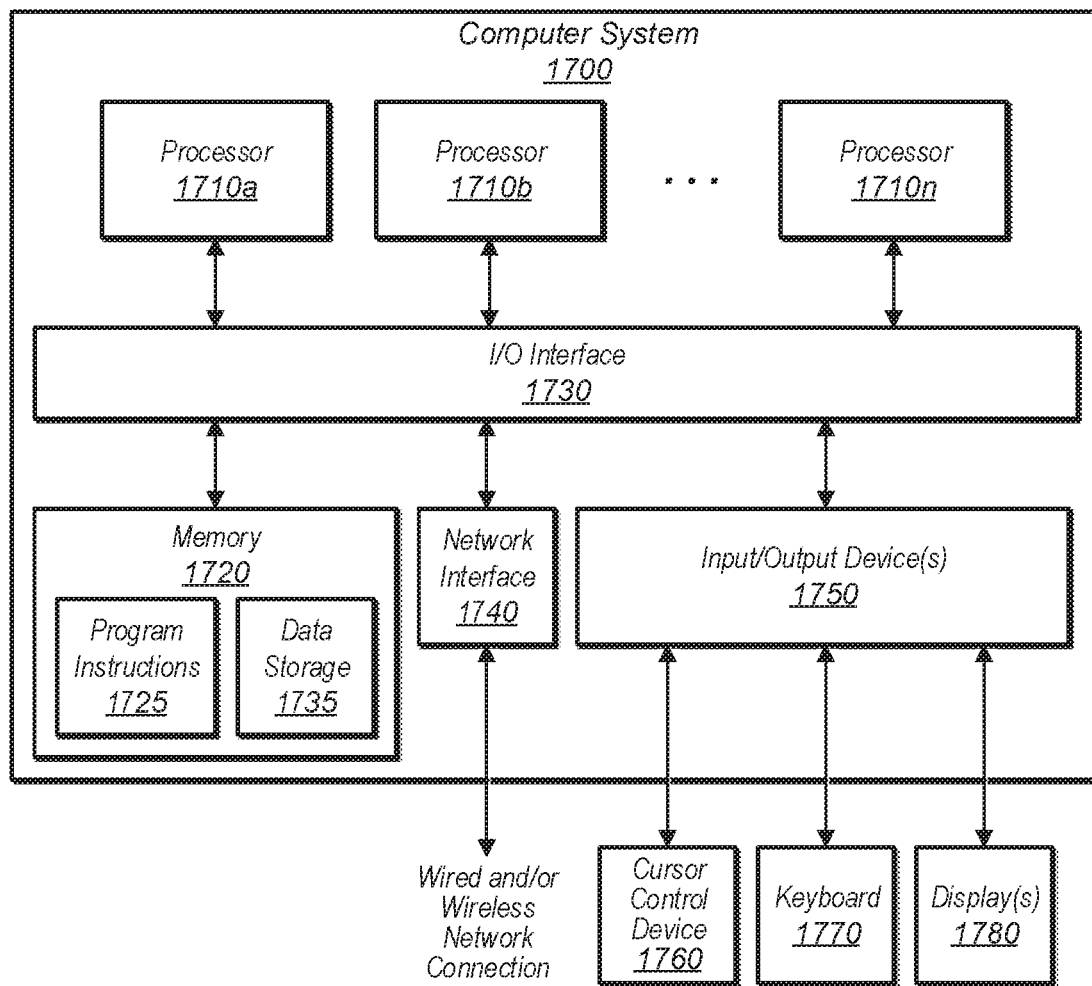
FIG. 17 is a block diagram illustrating an example computer system that implements some or all of the techniques described herein, according to some embodiments.

Any of various computer systems may be configured to implement processes associated with the provider network, hub devices, data source devices, network components, and edge devices of the above figures. For example, FIG. 17 is a block diagram illustrating an example computer system that implements some or all of the techniques described herein, according to some embodiments. In various embodiments, the provider network, hub devices, data source devices, network components, and edge devices of any of FIGS. 1-16 may each include one or more computer systems 1700 such as that illustrated in FIG. 17. In embodiments, the provider network, hub devices, data source devices, network components, and edge devices may include one or more components of the computer system 1700 that function in a same or similar way as described for the computer system 1700.

In the illustrated embodiment, computer system 1700 includes one or more processors 1710 coupled to a system memory 1720 via an input/output (I/O) interface 1730. Computer system 1700 further includes a network interface 1740 coupled to I/O interface 1730. In some embodiments, computer system 1700 may be illustrative of servers implementing enterprise logic or downloadable application, while in other embodiments servers may include more, fewer, or different elements than computer system 1700.

In various embodiments, computer system 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be embedded processors implementing any of a variety of instruction set architectures (ISAs), such as the x106, PowerPC, SPARC, or MIPS ISAs, or any other suitable ISA. In multiprocessor systems, each of processors 1710 may commonly, but not necessarily, implement the same ISA.

System memory 1720 may be configured to store instructions and data accessible by processor 1710. In various embodiments, system memory 1720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 1720 as program instructions 1725. In some embodiments, system memory 1720 may include data 1735 which may be configured as described herein (e.g., file objects, log objects, etc.).

In one embodiment, I/O interface 1730 may be configured to coordinate I/O traffic between processor 1710, system memory 1720 and any peripheral devices in the system, including through network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments, some or all of the functionality of I/O interface 1730, such as an interface to system memory 1720, may be incorporated directly into processor 1710.

Network interface 1740 may be configured to allow data to be exchanged between computer system 1700 and other computer systems 1700 or devices attached to a network, such as the network 706, the network 106, or a local network within the provider network, for example. In particular, network interface 1740 may be configured to allow communication between computer system 1700 and/or various I/O devices 1750. I/O devices 1750 may include scanning devices, display devices, input devices and/or other communication devices, as described herein. Network interface 1740 may commonly support one or more wireless networking protocols (e.g., Wi-Fi/IEEE 802.11, or another wireless networking standard). However, in various embodiments, network interface 1740 may support communication via any suitable wired or wireless general data networks, such as other types of Ethernet networks, for example. Additionally, network interface 1740 may support communication via telecommunications/telephony networks such as analog voice networks or digital fiber communications networks, via storage area networks such as Fibre Channel SANs, or via any other suitable type of network and/or protocol.

In some embodiments, system memory 1720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1700 via I/O interface 1730. A computer-readable storage medium may also include any volatile or non-volatile media such as RAM (e.g. SDRAM, DDR SDRAM, RDRAM, SRAM, etc.), ROM, etc., that may be included in some embodiments of computer system 1700 as system memory 1720 or another type of memory. Further, a computer-accessible medium may include transmission media or signals such as electrical, electromagnetic, or digital signals, conveyed via a communication medium such as a network and/or a wireless link, such as may be implemented via network interface 1740.

In some embodiments, I/O devices 1750 may be relatively simple or "thin" client devices. For example, I/O devices 1750 may be configured as dumb terminals with display, data entry and communications capabilities, but otherwise little computational functionality. However, in some embodiments, I/O devices 1750 may be computer systems configured similarly to computer system 1700, including one or more processors 1710 and various other devices (though in some embodiments, a computer system 1700 implementing an I/O device 1750 may have somewhat different devices, or different classes of devices).

In various embodiments, I/O devices 1750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1700. In general, an I/O device 1750 (e.g., cursor control device 1760, keyboard 1770, or display(s) 1780 may be any device that can communicate with elements of computing system 1700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   a plurality of edge devices connected to a local network that collect data, wherein individual ones of the plurality of edge devices comprise a processing function configured to:
   perform one or more operations on the data;
   generate processed data based on the one or more operations; and
   transmit the processed data to at least one hub device connected to the local network; and
   the at least one hub device connected to the local network, comprising:
   one or more processors; and
   one or more memories, wherein the one or more memories have stored thereon instructions, which when executed by the one or more processors, cause the one or more processors to implement:
   a data processing model, wherein the data processing model is configured to perform one or more operations on processed data received from the plurality of edge devices connected to the local network; and a function adaptation manager, wherein the function adaptation manager is configured to:
receive topology data indicating one or more changes in a number of the plurality of edge devices within the local network that transmit data to the hub device of the local network;
analyze the one or more changes in the number of the plurality of edge devices within the local network that transmit data to the hub device of the local network;
determine at the hub device, based on the analysis of the one or more changes in the number of the plurality of edge devices within the local network that transmit data to the hub device of the local network indicated by the received topology data, one or more modifications to processing functions that are located at the plurality of edge devices within the local network that transmit data to the hub device of the local network, wherein the one or more modifications to the processing functions cause the plurality of edge devices to reduce an amount of data transmitted within the local network to the hub device by increasing an amount of data collected by the plurality of edge devices that is filtered out from transmission within the local network from the plurality of edge devices to the hub device; and
deploy the one or more modifications from the hub device to the plurality of edge devices, wherein the one or more modifications are used to update the processing functions at the plurality of edge devices.

2. The system as recited in claim 1, wherein the function adaptation manager is configured to:
transmit the topology data to a remote provider network; and
receive the one or more modifications to processing functions from the remote provider network, wherein the one or more modifications are based on the topology data.

3. The system as recited in claim 1, wherein the function adaptation manager is configured to:
analyze the topology data; and
generate the one or more modifications to processing functions based on the analysis of the topology data.

4. The system as recited in claim 1, wherein to update the processing functions, the one or more modifications are configured to:
update a portion of the processing functions, or
replace the processing functions with new processing functions.

5. The system as recited in claim 1, wherein the modifications to processing functions are configured to:
reduce an amount of power consumed by the plurality of edge devices.

6. The system as recited in claim 1, wherein the modifications to processing functions are configured to:
reduce an amount of data transmitted by the plurality of edge devices.

7. A system, comprising:
one or more processors; and
one or more memories, wherein the one or more memories have stored thereon instructions, which when executed by the one or more processors, cause the one or more processors to implement a function adaptation service of a provider network, wherein the function adaptation service is configured to:
receive topology data from a remote network indicating one or more changes in a number of a plurality of edge devices connected to the remote network that transmit data to a hub device connected to the remote network;
analyze the one or more changes in the number of the plurality of edge devices within the remote network that transmit data to the hub device of the remote network;
generate at the provider network, based on the analysis of the one or more changes in the number of the plurality of edge devices within the remote network that transmit data to the hub device of the remote network indicated by the received topology data, one or more modifications to processing functions that are located at the plurality of edge devices within the remote network that transmit data to the hub device of the local network, wherein the one or more modifications to the processing functions cause the plurality of edge devices to reduce an amount of data transmitted within the remote network to a hub device connected to the remote network by increasing an amount of data collected by the plurality of edge devices that is filtered out from transmission within the remote network from the plurality of edge devices to the hub device, wherein the plurality of edge devices are connected to the remote network; and
transmit the one or more modifications from the provider network to the remote network.

8. The system as recited in claim 7, wherein the function adaptation service is configured to transmit the one or more modifications to processing functions to the plurality of edge devices of the remote network.

9. The system as recited in claim 7, wherein to transmit the one or more modifications from the provider network to the remote network, the function adaptation service is configured to transmit the one or more modifications to at least one hub device connected to the remote network.

10. The system as recited in claim 7, wherein the one or more modifications to processing functions are configured to increase a level of redundancy associated with at least one of the respective processing functions.

11. The system as recited in claim 7, wherein the one or more modifications to processing functions are configured to reduce an amount of data transmitted by the plurality of edge devices of the remote network.

12. The system as recited in claim 7, wherein the function adaptation service is configured to:
generate one or more modifications to a data processing model based on the analysis of the topology data, wherein the one or more modifications are configured to update the data processing model at one or more hub devices connected to the remote network that processes data from the plurality of edge devices; and
transmit the one or more modifications to the data processing model to the one or more hub devices.

13. The system as recited in claim 7, wherein the one or more modifications are configured to replace the one or more processing functions at the plurality of edge devices.

14. A method, comprising:
performing, by a data processing model of at least one hub device connected to a local network, one or more operations on processed data received from a plurality of edge devices connected to the local network;

receiving, by the at least one hub device, topology data indicating one or more changes in a number of the plurality of edge devices within the local network that transmit data to the hub device of the local network;

analyzing the one or more changes in the number of the plurality of edge devices within the local network that transmit data to the hub device of the local network;

determining, by the at least one hub device, one or more modifications to processing functions that are located at the plurality of edge devices, wherein the one or more modifications are based on the analysis of the one or more changes in the number of the plurality of edge devices within the local network that transmit data to the hub device of the local network indicated by the received topology data, and wherein the one or more modifications are configured to cause the respective plurality of edge devices to reduce an amount of data transmitted within the local network to the hub device by increasing an amount of data collected by the plurality of edge devices that is filtered out from transmission within the local network from the plurality of edge devices to the hub device; and deploying the one or more modifications from the hub device to the respective plurality of edge devices.

15. The method as recited in claim 14, further comprising:
transmitting the topology data to a remote provider network; and
receiving the one or more modifications to processing functions from the remote provider network.

16. The method as recited in claim 15, further comprising:
analyzing, by the at least one hub device, at least a portion of the topology data; and
updating, by the at least one hub device, the one or more modifications to processing functions based at least on the analysis of the topology data.

17. The method as recited in claim 14, further comprising:
analyzing, by the at least one hub device, the topology data; and
generating the one or more modifications to processing functions based on the analysis of the topology data.

18. The method as recited in claim 14, further comprising:
analyzing, by the at least one hub device, the topology data;
generating one or more modifications to the data processing model of the at least one hub device based on the analysis of the topology data; and
updating the data processing model using the one or more modifications to the data processing model.

19. The method as recited in claim 14, further comprising, wherein the one or more modifications are configured to reduce an amount of power consumed by the plurality of edge devices or to reduce an amount of data transmitted by the plurality of edge devices.

20. The method as recited in claim 14, further comprising, subsequent to updating the one or more processing functions:
receiving, by the at least one hub device, additional topology data indicating one or more additional changes in the bandwidth used between different devices within the local network;
determining, by the at least one hub device, one or more additional modifications to processing functions for the plurality of edge devices, wherein the one or more additional modifications are based on the additional topology data; and
deploying the one or more additional modifications to the plurality of edge devices.

\* \* \* \* \*